United States Patent [19]
Arden

[11] 3,821,420
[45] June 28, 1974

[54] STABILIZED COCOA FLAVORED SYRUPS AND METHODS OF MAKING AND USING THE SAME

[75] Inventor: Sidney Arden, Forest Hills, N.Y.

[73] Assignee: Consolidated Food Corporation d/b/a Popsicle Industries, Englewood, N.J.

[22] Filed: Apr. 14, 1971

[21] Appl. No.: 134,049

[52] U.S. Cl.................. 426/45, 426/171, 426/172
[51] Int. Cl................................................ A23g 1/00
[58] Field of Search............ 99/26, 23; 426/45, 171, 426/172, 204, 213, 342, 352, 380

[56] References Cited
UNITED STATES PATENTS
| | | | |
|---|---|---|---|
| 2,014,342 | 9/1935 | Gutekunst.............................. | 99/26 |
| 3,615,659 | 10/1971 | Weber.................................. | 99/26 |

Primary Examiner—Robert L. Lindsay, Jr.
Assistant Examiner—Peter Chin
Attorney, Agent, or Firm—Seidel, Gonda & Goldhammer

[57] ABSTRACT

Cocoa flavored syrups having a high cocoa content and excellent stability and flow properties at room temperature may be produced by using an amylolytic enzyme and a sufficient proportion of Dutch process cocoa to provide a syrup pH of 5.5 to 7.5. The syrup is made by alternate addition of cocoa and sweetner to sufficient water to achieve a solids content of about 58 to 65 weight percent, adding an amylolytic enzyme, heating to a temperature of about 175° to 185° F. for at least 10 to 15 minutes, raising the temperature to about 200° F. and cooling. The stabilized cocoa flavored syrups may be added at room temperature to conventional non-acid confection mixes for use in the production of quiescently frozen chocolate flavored confections.

10 Claims, No Drawings

STABILIZED COCOA FLAVORED SYRUPS AND METHODS OF MAKING AND USING THE SAME

The present invention relates to stabilized cocoa flavored syrups and methods of making and using the same. More particularly, the present invention is directed to high cocoa content syrups having excellent stability and flow properties at room temperature for use in the production of chocolate flavored quiescently frozen confections and chocolate flavored water base coatings.

Up to the present time virtually all quiescently frozen chocolate flavored confections, and particularly stick-type frozen confections, have been made by using a chocolate powder. Due to the limited solubility of chocolate powder in water, the manufacturer of such frozen confections has required extensive heating of the chocolate powder and the confection mix to pasteurization temperatures (e.g., 145° to 160° F.) in order to insure complete solubility.

This requirement of extensive heating presents a distinct disadvantage to the individual ice cream or confection manufacturer since additional time and equipment are required in the manufacturing process. Accordingly, it would be desirable to provide a readily soluble form of cocoa which could be directly mixed by the confection manufacturer with the confection mix without the necessity of heating the cocoa and the mix.

Although chocolate or cocoa flavored syrups are well known in the art, such syrups usually contain a relatively low proportion of cocoa. Thus, such syrups generally contain from about 4 or 5 percent to about 12 or 13 percent cocoa or chocolate.

It is also known that the maximum cocoa content of these syrups can be raised by degrading the syrups with diastatic enzymes. However, the maximum cocoa content is still only about 20 percent, with concentrations of cocoa over 20 percent resulting in a slurry which is too thick for processing and which has a decided tendency to burn on the sides of the heating kettle. Moreover, the addition of sugar slows the diastatic action so that higher temperatures and much longer holding times are required to complete the thinning process.

In addition to the above difficulties, previously known chocolate or cocoA flavored syrups are frequently not stable for any extended period of time at room temperature except where low cocoa contents, high solids contents and special packing procedures are used. Hence, special storage conditions at cooler than ambient temperatures have generally been necessary to prevent spoilage of the syrups or destruction of the flowable properties of these syrups.

Accordingly, it is an object of the present invention to provide an improved cocoa flavoring for frozen confections and the like.

It is a further object of the present invention to provide a cocoa flavored syrup having a high concentration of cocoa.

It is a still further object of the present invention to provide a cocoa flavored syrup having a high cocoa content and excellent stability and flow properties.

It is another object of the present invention to provide an improved process for producing high cocoa content flavoring syrups.

It is still another object of the present invention to provide a stabilized cocoa flavored syrup which may be readily mixed at ambient temperatures with conventional confection mixes for use in the production of quiescently frozen chocolate flavored confections and water base chocolate coatings.

Other objects will appear hereinafter.

The above and other objects are achieved by the composition of the present invention which comprises a solution containing from about 18 to 25 weight percent cocoa, from about 35 to 45 weight percent of a sweetener, an amylolytic enzyme, and sufficient water to achieve a solution solids content of about 58 to 65 weight percent. The amylolytic enzyme is present in an amount equivalent to about 0.1 to 0.6 weight percent of an enzyme having an alpha amylast activity of 4.4 mgs. per mg. starch, and the cocoa comprises sufficient Dutch process cocoa to maintain a solution pH of about 5.5 to 7.5.

The above composition is made by alternately adding cocoa and sweetener to water under agitation, heating the mixture to form a solution, adding the amylolytic enzyme, maintaining the solution including the enzyme at a temperature of about 175° to 185° F. for at least 10 to 15 minutes, then raising the temperature of the solution to about 200° F., and finally cooling the solution.

Quiescently frozen chocolate flavored confections using the above compositions may be made simply by adding the stabilized cocoa flavored syrup to a conventional confection mix including sweetener, vegetable gum and water, the addition being carried out at ambient temperatures under agitation, pouring the resulting mixture into molds, and freezing the mixture.

The term "cocoa flavored syrups" as used in the following specification and claims will be understood to refer to syrups prepared from cocoa as distinguished from chocolate syrups which are prepared with chocolate liquor. Cocoas are characterized by a relatively low fat content which may vary from about 8 to 10 percent for low fat cocoas to 26 to 28 percent for high fat breakfast cocoas. On the other hand, chocolate liquor has a fat content of about 50 to 55 percent, and accordingly can not be used except in very small quantities as a cocoa substitute without destroying the flow properties of the cocoa flavored syrups.

The cocoa flavored syrups of the present invention should contain about 18 to 25 weight percent, and preferably 21 to 25 weight percent of cocoa. Low fat cocoa (i.e., 10 to 12 percent cocoa fat) are preferred for the syrups since the low fat contributes to the increase liquidity of the product at room temperature storage. However, cocoas with higher fat content (e.g., 12 to 22 weight percent fat) can be used by reducing the total cocoa content in the syrup to the lower end of the acceptable range indicated above.

The crucial consideration in determining the particular cocoa or cocoa mixture to be used in the syrups of the present invention is that the syrup solution have a pH of about 5.5 to 7.5 to insure the most effective enzyme activity. Natural or American process cocoa generally has a pH of about 5.2 to 6.0, whereas Dutch process cocoa has a normal pH range of about 6.8 to 8.0. Thus, as is evident, it is possible by selection of a cocoa having an appropriate pH to use either all natural process cocoa or all Dutch process cocoa.

However, it is preferred to use a mixture of natural process and Dutch process cocoas, and particularly a mixture which contains greater than 50 percent Dutch process cocoa by weight. Inclusion of the alkaline Dutch process cocoa insures adjustment of the pH of the syrup to the proper range for maximum enzyme activity and lowers the viscosity of the finished product. Of course, within the limitations of the desired pH range, different proportions of natural process and Dutch process cocoas can be used to achieved various desired flavor effects.

A sweetener should be present in the stabilized cocoa flavored syrups of the present invention to an extent of about 35 to 45 weight percent, and preferably 38 to 42 weight percent, based on the total weight of the syrup solution. Suitable sweeteners include but are not limited to cane sugar, corn sugar, corn syrup, and corn syrup solids. Cane sugar is particularly preferred because of its flavor and preservative qualities.

The enzymes used in making the syrups of the present invention may be selected from any of a number of amylolytic enzymes conventionally used for the breaking down or hydrolyses of starch (polysaccharides) to simple sugars (e.g., glucose), the diastases (vegetable amylases) being preferred. Particularly preferred are the high temperature or extremely heat stable liquefying enzymes from bacterial sources which are high in alpha amylase activity. An example of a preferred commercially available enzyme of this type is HT-44 Amylase, which is Miles Laboratories, Inc. designation for a high temperature alpha amylase having an activity of 4.4 mgs. alpha amylase per mg. starch. Other heat stable liquefying enzymes from the same bacterial source, except with higher alpha amylase activity, can be used as preferred substitutes for the HT-44 Amylase in the syrups of the present invention.

The amount of amylolytic enzyme used in the compositions of the present invention is inversely proportional to the amylase activity of the enzyme. For example, where the preferred HT-44 Amylase having an alpha amylase activity of 4.4 mgs. per mg. starch is used, the alpha amylase enzyme should be present in an amount of about 0.1 to 0.6 weight percent, and preferably 0.3 to 0.55 weight percent, based on the total weight of the syrup solution.

Thus, where HT-440 Amylase (44 mgs. alpha amylase activity per mg. starch) is substituted for HT-44 Amylase, the amount of enzyme needed is reduced by a factor of 10. Similarly, where HT-1,000 Amylase (100 mgs. alpha amylase activity per mg. starch) or HT-2,000 Amylase (200 mgs. alpha amylase activity per mg. starch) is substituted for HT-44 Amylase, the amounts of enzyme needed are reduced by factors of 1,000/44 and 2,000/44, respectively. Equivalent amounts of other suitable enzymes will be obvious to one of ordinary skill in the art based on the above criteria.

The stabilized cocoa flavored syrups of the present invention may also contain other ingredients, such as seasoning and other flavorings, as desired. Seasonings such as salt may be added to taste, and preferably up to about 0.2 weight percent. Other flavorings, aside from cocoa, such as vanillin, pure vanilla, ethyl vanillin and mixtures of the above may also be added to taste.

The amount of water present in the stabilized cocoa flavored syrups of the present invention may vary somewhat depending on the choice of cocoa and sweetener. However, in order to obtain the desirably high cocoa concentration and good flow properties, as well as to achieve stability of the syrups at room temperature, it is necessary that sufficient water be used to yield a total solids content in the solution of about 58 to 65 weight percent, and preferably 61 to 64 weight percent, based on the total weight of the syrup solution. A particularly preferred syrup is one in which the solids content is about 62.5 to 63.5 weight percent. Lower solids contents that the above ranges will result in substantial decreases in syrup stability, as well as lowering the cocoa concentration, whereas solids contents above these ranges will result in losses of the desirable flow properties, thus making syrups which are difficult to handle.

Where cocoas in the upper part of the acceptable fat content range (i.e., up to about 22 percent cocoa fat) or cocoa blends with a high proportion of natural process cocoa are selected, the viscosity of the syrup will be increased. Accordingly, in such cases more water is required to achieve a good flow properties. Likewise, high viscosity sweeteners such as corn syrup require an upward adjustment in the water content to obtain good flow properties.

The process of making stabilized cocoa flavored syrups of the present invention will now be described. The process may be carried out in any suitable kettle of conventional manufacture which is provided with agitation means and heating, such as a heating jacket.

The water is first added to the kettle and the agitator is started. Next, the cocoa and sweetener are added alternately to the water. Heating of the kettle and its contents is begun as soon as the addition of cocoa and sweetener begins. The alternate addition of cocoa and sweetener prevents excessive thickening of the syrup during the initial heating stages. Without this procedure, the batch can not be effectively mixed, and tends to burn on the side of the kettle.

Where a mixture of Dutch process and natural process cocoas, as is preferred, is used, the alternate addition of cocoa and sweetener should commence with the addition of part of the Dutch process cocoa. By use of a major proportion of Dutch process cocoa in the total cocoa content, a significant lowering of the initial mix viscosity may be achieved. In addition, the major proportion of Dutch process cocoa allows for the careful regulation of the batch pH in the range of 5.5 to 7.5, where the high temperature alpha amylase activity is most effective.

After the addition of cocoa and sweetener, the enzyme is added and the batch temperature is raised to a temperature of about 175° to 185° F., and preferably 175° to 180° F., and maintained at that level for at least 10 to 15 minutes, thus allowing the enzyme to react in the syrup mixture and preventing gelatination of the cocoa.

It has unexpectedly been found that the use of a major proportion of Dutch process cocoa in the total cocoa content and the alternate addition of cocoa and sweetener permits the desired thinning effect to be achieved at the relatively low temperatures and relatively short time indicated above. Thus, as noted earlier, previous processes involving the degradation of chocolate or cocoa syrups by diastatic enzymes have required much higher temperatures and/or much longer holding times in order to complete the thinning process. However, the process of the present invention achieves required for cocoa and water alone. Also, with the process of the present invention it is possible to increase the cocoa content and thus achieve a more concentrated chocolate flavoring.

After the 10 to 15 minutes retention of the syrup at 175° to 185° F., the temperature of the syrup is raised to about 200° F. for pasteurization of the syrup and destruction of the enzyme.

After pasteurization of the syrup, the heat may be turned off and the vanillin or other flavoring and salt may be added as desired and mixed well into the syrup. The syrup may then be cooled and stored in pails at room temperature.

As long as the pails or containers for the syrup remain sealed, the stabilized cocoa flavored syrups of the present invention may be stored indefinitely at room temperature without spoilage or destruction of the flowable properties. A particularly high stability and preservative effect is achieved when the sugar content is adjusted in the above process to an amount yielding a total solids content in the syrup solution of about 62.5 to 63.5 weight percent.

The stabilized cocoa flavored syrups of the present invention and the method of making the same will now be illustrated in more detail with reference to the following specific, non-limiting examples:

EXAMPLE I

A preferred stabilized cocoa flavored syrup was made with the following ingredients:

| COMPONENT | Wt. Percent |
|---|---|
| Natural Process Cocoa (10–12% fat) | 9.64 |
| Dutch Process Cocoa (10–12% fat) | 14.45 |
| Extra Fine Sugar | 40.00 |
| Salt | 0.07 |
| HT-44 Amylase (Miles Laboratories | 0.43 |
| Vanillin | 0.08 |
| Water | 35.33 |
| Total: | 100.00 |

The water was added to a kettle provided with an agitator and a steam heating jacket. The agitator was started and cocoa and sugar were added alternately in small portions starting with the Dutch process cocoa. During this addition the heat was turned on and after the addition was complete the enzyme was added and the batch temperature raised to 177° F. The batch was maintained at 175° to 180° F. for 10 to 15 minutes and then heated to 200° F. The steam heat was shut off and the vanillin and salt were added and mixed in well. Analysis of a drawn off sample indicated a total solids weight percent (° Brix) of 62.5 to 63.5. The syrup solution was taken out into five gallon pails containing about 50 pounds net each. The pails were sealed and inverted and stored at room temperature. The above batch showed excellent stability and retention of flow properties during the storage.

The following examples illustrate additional stabilized cocoa flavored syrup compositions of the present invention which are prepared by the same process as described in Example I:

EXAMPLE II

| COMPONENT | Wt. Percent |
|---|---|
| Natural Process Cocoa 10–12% fat | 10.00 |
| Dutch Process Cocoa 10–12% fat | 14.00 |
| Cane Sugar | 31.00 |
| Corn Sugar | 10.00 |
| Salt | 0.07 |
| HT-44 Amylase | 0.40 |
| Vanillin | 0.08 |
| Water | 34.45 |
| Total: | 100.00 |

EXAMPLE III

| COMPONENT | Wt. Percent |
|---|---|
| Natural Process Cocoa 10–12% fat | 15.00 |
| Dutch Process Cocoa 10–12% fat | 8.00 |
| Cane Sugar | 40.00 |
| Salt | 0.05 |
| H.T. –44 Amylase | 0.50 |
| Vanillin | 0.08 |
| Water | 36.37 |
| Total: | 100.00 |

EXAMPLE IV

| COMPONENT | Wt. Percent |
|---|---|
| Natural Process Cocoa 12–14% fat | 9.00 |
| Dutch Process Cocoa 10–12% fat | 14.50 |
| Cane Sugar | 40.00 |
| Salt | 0.07 |
| H.T. –44 Amylase | 0.43 |
| Vanillin | 0.08 |
| Water | 35.92 |
| Total: | 100.00 |

EXAMPLE V

| COMPONENT | Wt. Percent |
|---|---|
| Natural Process Cocoa 10–12% fat | 9.50 |
| Dutch Process Cocoa 10–12% fat | 14.00 |
| Cane Sugar | 35.00 |
| Corn Syrup | 5.00 |
| Salt | 0.07 |
| H.T. 44 Amylase | 0.43 |
| Vanillin | 0.08 |
| Water | 36.42 |
| Total: | 100.00 |

EXAMPLE VI

| COMPONENT | Wt. Percent |
|---|---|
| Natural Process Cocoa 16–18% fat | 9.00 |
| Dutch Process Cocoa 12–14% fat | 14.00 |
| Can Sugar | 40.00 |
| Salt | 0.07 |
| H.T. 44 Amylase | 0.43 |
| Vanillin | 0.08 |
| Water | 36.42 |
| Total: | 100.00 |

EXAMPLE VII

| COMPONENT | Wt. Percent |
|---|---|
| Natural Process Cocoa 10–12% fat | 10.00 |
| Dutch Process Cocoa 10–12% fat | 14.00 |
| Cane Sugar | 40.00 |
| Salt | 0.07 |
| H.T. 440 Amylase (equivalent to 0.44% H.T. enzyme in amylase activity) | 0.04 |
| Vanillin | 0.08 |
| Water | 35.81 |
| Total: | 100.00 |

The above described cocoa flavored syrups of the present invention may be used to prepare chocolate flavored quiescently frozen confections by simply blending the syrup at room temperature with a conventional confection mix. Such confection mixes generally comprise a sweetener, vegetable gum or other stabilizer, and water in addition to the flavoring.

The sweetener of the confection mix may suitably be cane sugar or a blend of cane and corn sugar or corn syrup solids. The vegetable gum may be a single gum or a blend selected from locust bean gum, guar gum, gum karaya, gum tragacanth, carboxymethyl cellulose, irish moss and sodium alginate.

A method of using the stabilized cocoa flavored syrups of the present invention in the preparation of quiescently frozen chocolate flavored confections is illustrated by the following specific example:

EXAMPLE A

A quiescently frozen confection is prepared from the following ingredients:

| COMPONENT | Weight |
|---|---|
| Stabilized Cocoa Flavored Syrup of Example I | 5.5 lb. (64 fl. ozs.) |
| Sugar | 17.0 lb. |
| Vegetable gum | 0.2 lb. |
| Water | 77.3 lb. |
| Total: | 100.0 lb. |

Most of the water is added to a vat equipped with a high speed agitator. The vegetable gum mixed with three or four times its weight in dry sugar is sprinkled into the water at the point of greatest agitation. After the vegetable gum is completely dispersed (5 to 10 minutes), the remaining sugar and the cocoa flavored syrup are added. Finally, the remaining water is added and the batch is mixed until all solids are dispersed. Agitation is continued until the mix is drawn off into molds in order to prevent settling of the cocoa solids. Aging for several hours is also helpful to secure maximum stabilization effect. After the mix is drawn off into molds, the confections are frozen at the lowest possible brine temperature.

As is evident, the above preparation does not require the extensive heating which has been necessary until now where cocoa-sugar powder blends have been used to prepare quiescently frozen confections. Also, while it is possible to flavor quiescently frozen confection mixes with a syrup of lesser cocoa content than those obtained in the present invention, a substantial loss of convenience and economy results. Moreover, less concentrated syrups require special formula adjustment of the mix to accommodate the extra water.

In addition to their use in preparing molded frozen confections, such as frozen stick confections, the stabilized cocoa flavored syrups of the present invention may also be effectively used in water base coatings, such as to form a frozen shell over an ice cream or ice milk center. Other uses will also occur to those of ordinary skill in the art.

It will be understood that the term "solution" as used in the foregoing specification and following claims is not limited to true solutions, but covers suspensions and dispersions, since cocoa solids include fiber material which is suspended rather than dissolved.

The present invention may be embodied in other specific forms without departing from the spirit or essential attributes thereof and, accordingly, reference should be made to the appended claims, rather than to the foregoing specification as indicating the scope of the invention.

I claim:

1. A method of making a stabilized cocoa-flavored syrup having a high cocoa content comrising the steps of alternately adding cocoa and sweetener to water under agitation, heating the aqueous mixture to form a solution, adding an amylolytic enzyme in an amount equivalent to about 0.1 to 0.6 weight percent enzyme having an activity of 4.4 mgs. alpha amylase per mg. starch, maintaining the solution including said enzyme at a temperature of about 175° to 185°F. for at least 10 to 15 minutes, further heating the solution to a pasteurization temperature of about 200°F., and cooling the solution, said cocoa constituting about 18 to 25 weight percent of said solution, said cocoa being selected from the group consisting of Dutch process cocoas, natural process cocoas and mixtures thereof such as will produce a solution pH of about 5.5 to 7.5, said sweetener constituting about 35 to 45 weight percent of said solution, and said solution containing sufficient water to yield a total solids content of about 58 to 65 weight percent of said solution.

2. A method of making a stabilized cocoa flavored syrup in accordance with claim 1 wherein said cocoa comprises a mixture of low fat cocoas including a major portion of Dutch process cocoa and a minor portion of natural process cocoa.

3. A method of making a stabilized cocoa flavored syrup in accordance with claim 2 wherein the alternate addition of cocoa and sweetener commences with the addition of part of said Dutch process cocoa.

4. A method of making a stabilized cocoa flavored syrup in accordance with claim 1 wherein the cocoa is added in an amount of about 21 to 25 weight percent, the sweetener is added in an amount of about 38 to 42 weight percent, the enzyme is added in an amount equivalent to about 0.3 to 0.55 weight percent enzyme having an activity of 4.4 mgs. alpha amylase per mg. starch, and the total solids content is about 61 to 64 weight percent.

5. A stabilized cocoa flavored syrup made according to the method of claim 1.

6. A stabilized cocoa flavored syrup made according to the method of claim 4.

7. A method of making a stabilized cocoa-flavored syrup in accordance with claim 1 wherein said amylolytic enzyme is a diastase.

8. A stabilized cocoa-flavored syrup made according to the method of claim 3.

9. A stabilized cocoa-flavored syrup made according to the method of claim 2.

10. A stabilized cocoa-flavored syrup made according to the method of claim 7.

* * * * *

UNITED STATES PATENT OFFICE
CERTIFICATE OF CORRECTION

PATENT NO. : 3,821,420
DATED : June 28, 1974
INVENTOR(S) : Sidney Arden

It is certified that error appears in the above-identified patent and that said Letters Patent are hereby corrected as shown below:

In cover page, item [73], the Assignee should read -- Consolidated Foods Corporation --. In column 1, line 45, "cocoA" should read -- cocoa --. In column 4, line 7, "that" should read -- than --. In column 4, line 66, the end of the sentence should read as follows: -- achieves the same thinning effect within the same temperature and time range required for cocoa and water alone.--. In column 6, EXAMPLE VI, the third component should read -- Cane Sugar --. In column 7, line 45, "comrising" should read -- comprising --.

Signed and sealed this 17th day of June 1975.

(SEAL)
Attest:

RUTH C. MASON
Attesting Officer

C. MARSHALL DANN
Commissioner of Patents
and Trademarks